United States Patent [19]
Takahashi
[11] Patent Number: 4,511,904
[45] Date of Patent: Apr. 16, 1985

[54] RECORDING APPARATUS

[75] Inventor: Tomohiko Takahashi, Tokyo, Japan
[73] Assignee: Tokyo Shibaura Denki Kabushiki Kaisha, Kawasaki, Japan

[21] Appl. No.: 541,911
[22] Filed: Oct. 14, 1983
[30] Foreign Application Priority Data
Oct. 18, 1982 [JP] Japan .......................... 57-156315[U]
[51] Int. Cl.3 ....................... G01D 15/24; B65H 1/00; B65H 7/02; B41J 13/10
[52] U.S. Cl. .................................... 346/134; 271/171; 271/265; 400/624; 250/222.1
[58] Field of Search ..................... 346/134; 250/222.1; 271/165, 171, 265; 400/624, 625, 629

[56] References Cited

U.S. PATENT DOCUMENTS 3,882,308 5/1975 Daughton et al. ............... 250/222.1
4,395,127 7/1983 Duvall ......................... 250/222.1 X

FOREIGN PATENT DOCUMENTS 97968 2/1979 Japan .................................. 271/171

OTHER PUBLICATIONS

Colglazier, D. F. et al., Paper Size Indication, IBM Technical Disclosure Bulletin, Dec. 1975, vol. 18, No. 7, pp. 2057–2058.
Dunning, G. R., Paper-Width Compensator for Sheet Feeder, IBM Technical Disclosure Bulletin, Oct. 1981, vol. 24, No. 5, pp. 2274–2275.
Collins, Joseph, System for Automatically Adjustable Side Guides, Xerox Disclosure Journal, Sep./Oct. 1976, vol. 1, Nos. 9/10, pp. 41–42.

*Primary Examiner*—George H. Miller, Jr.
*Attorney, Agent, or Firm*—Cushman, Darby & Cushman

[57] ABSTRACT

In a recording apparatus designed to effect printing onto a sheet of paper, a main body is provided with a printing means arranged to effect printing onto the sheet of paper. The main body is provided with a cassette-mounting portion into which a cassette used to receive therein a sheet of paper to be fed toward the printing means is mounted from above the main body and obliquely with respect thereto. The cassette is provided with a sheet size regulating plate slidable in accordance with the size of the sheet received therein. The sheet size regulating plate is provided at one end with a magnet. On the other hand, the cassette-mounting portion is provided with a sensor operating at the time when said magnet moves to come near thereto. This sensor is connected to a display plate provided to the main body. Accordingly, when the sensor senses the position of the magnet, display is made of the size of the sheet set in the cassette by the display plate.

15 Claims, 18 Drawing Figures

RECORDING APPARATUS

BACKGROUND OF THE INVENTION

The present invention relates to a recording apparatus which is designed to record prescribed information onto a sheet.

A compact-sized and inexpensive heat transfer printing apparatus is known as a non-impact printer. Conventionally, in this type of printing apparatus, a paper-sheet feeding cassette receiving therein a sheet of only one size, for example, A-4 size paper, is mounted into a main body of the apparatus obliquely from above, and the sheet of paper is thereby fed into the main body. However, a miniaturized printing apparatus which has the capability of handling various size sheets of paper using only one paper-sheet feeding cassette and also the capability of displaying the size of the sheet to be supplied thereinto, has hitherto been in demand.

SUMMARY OF THE INVENTION

Accordingly, the object of the present invention is to provide a compact recording apparatus which enables a supply of various size sheets of paper to be supplied to a single paper-sheet feeding cassette which makes it possible to easily detect the size of the sheet to be supplied thereinto and to reliably display the size.

According to an aspect of the invention, there is provided a recording apparatus for recording information onto a sheet which comprises a main body, a printing means provided in said main body for effecting the printing onto said sheet, a cassette for receiving the sheet provided separately from said main body, a cassette-mounting means for mounting said cassette at a position located above said main body and obliquely with respect thereto, a sheet feeding means for feeding said sheet received in said cassette toward said printing means, a stopper means movably provided to said cassette in accordance with various size sheets received in said cassette, thereby setting said sheet into said cassette, a sheet size regulating member connected to said stopper means and movably provided to a prescribed position in accordance with the movement of said stopper means, a sheet size sensing means for sensing the size of the sheet received in said cassette provided to said cassette-mounting means and sensing the position of said sheet size regulating member and generates a detection signal, and a display means for displaying the size of the sheet received in said cassette in accordance with the signal from said sheet size sensing means.

DETAILED DESCRIPTION OF THE PREFERRED EMBODIMENT

Hereinunder, an embodiment of the present invention will be described in detail in connection with FIGS. 1 through 18 of the accompanying drawings.

Figure 1:
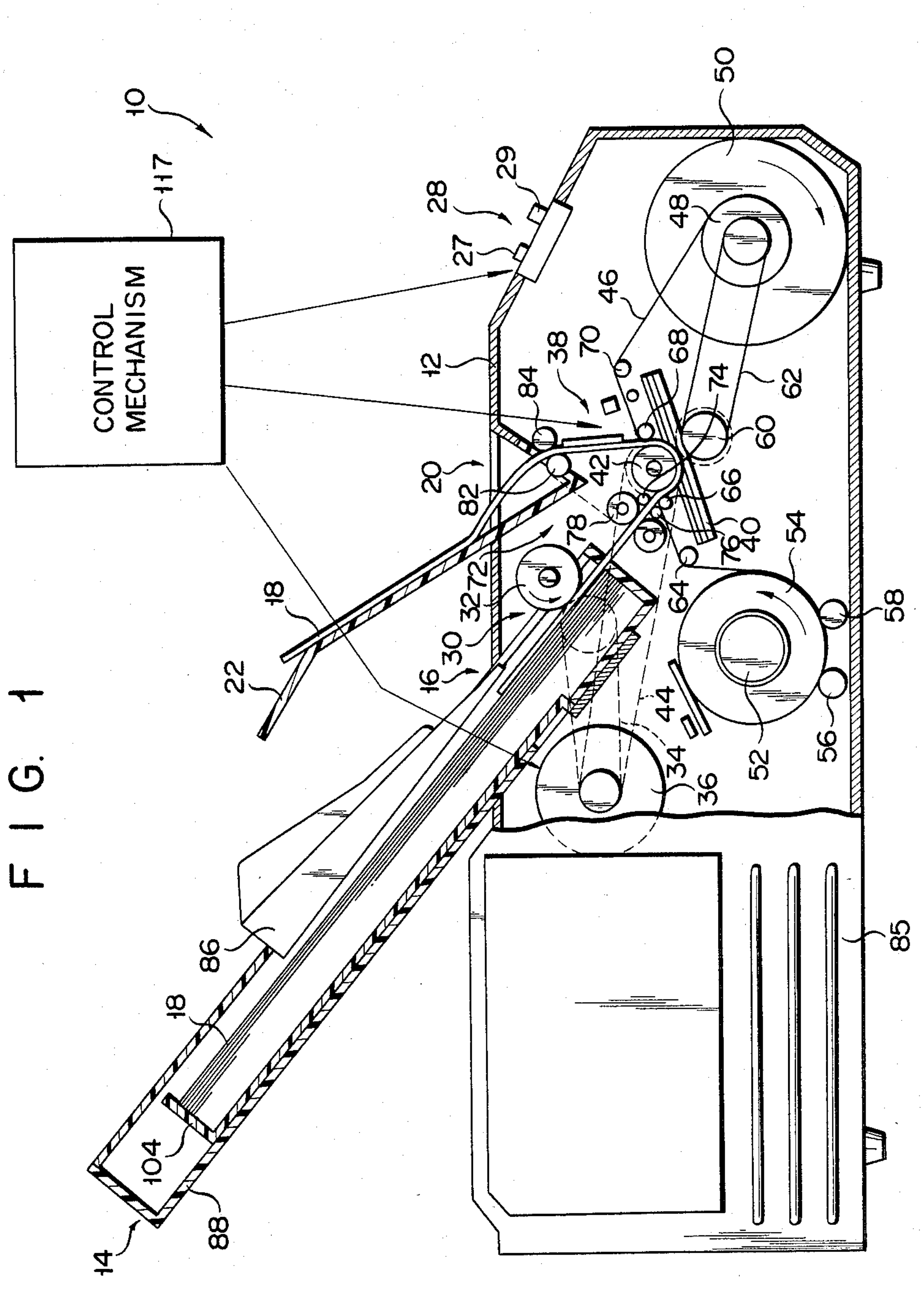
FIG. 1 is a front view, partly in section, of a heat transfer printing apparatus according to an embodiment of the invention.
Figure 2:
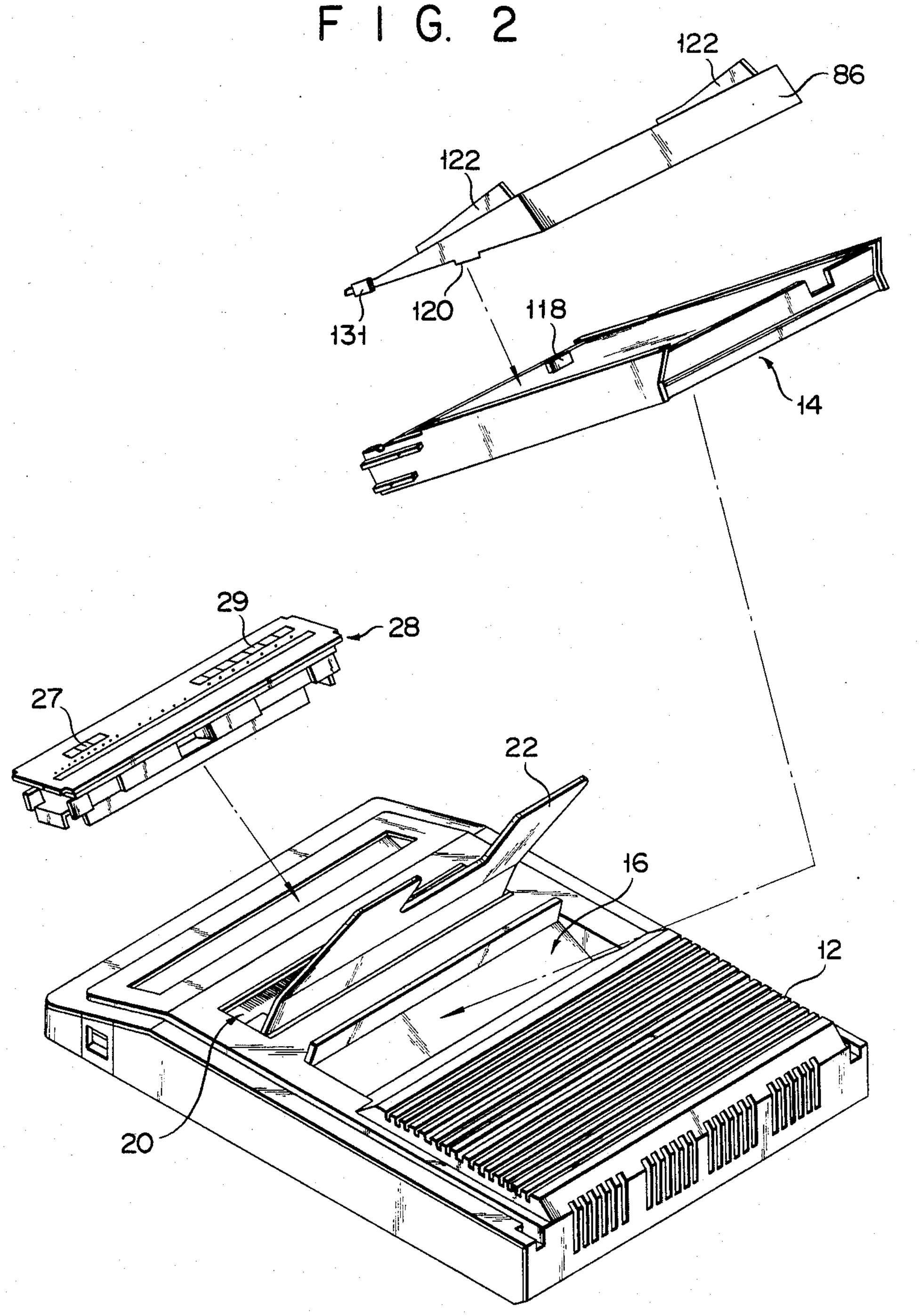
FIG. 2 is a disassembled perspective view showing a cassette-mounting portion of the heat transfer printing apparatus shown in FIG. 1.

In a heat transfer printing apparatus 10 (which is defined in this specification as falling within the concept of "recording apparatus") shown in FIGS. 1 and 2, a case 12 is formed with a cassette-mounting bore 16 into which a cassette 14 as later described is inserted from above and obliquely at the angle of elevation of approximately 40°. Since the cassette 14 is mounted obliquely to a main body of the heat transfer printing apparatus 10, it is possible to decrease the space occupied by the apparatus mounted with the cassette. The case 12 is also formed, at a position adjacent to this cassette-mounting bore, with a discharge bore or opening 20 from which a recording or printing paper sheet 18 having been printed within the case 12 is discharged or taken out. This discharge bore 20 is provided with a first guide plate 22 for guiding the recording sheet 18 to be discharged in such a manner that this first guide plate is inclined with respect to the surface of the case 12. The case 12 is also provided, at its forward position (the right side of the illustration of FIG. 1), with an operating plate 28 on which are disposed operating buttons 29 for operating this heat transfer printing apparatus as well as display lamps 27 for displaying the signals from a sheet sensing mechanism 24 (shown in FIG. 7) and a sheet size sensing mechanism 26 (shown in FIG. 7).

Inside the case 12, a cassette-mounting portion 30 is provided at a position approximate to the cassette-mounting bore 16 and is mounted with the cassette 14 having been inserted from the cassette-mounting bore. In the cassette-mounting portion 30, there is disposed a take-out roller 32 intended to take out the recording sheet 18 from the cassette 14 above-mounted, on sheet by sheet basis. The take-out roller 32 is connected to a motor 36 through a drive force transmission mechanism 34.

At a position toward which the recording sheet 18 taken out from the cassette 14 is delivered, there is provided a recording or printing mechanism 38 for printing the recording sheet. The printing mechanism 38 is provided with a thermal head 40 for effecting the printing and a head roller 42 for conveying the recording sheet while pressing the same against that thermal head 40. The head roller 42 is connected to the motor 36 through a drive belt 44. Between the head roller 42 and the thermal head 40, a transfer ribbon 46 is sandwiched in a manner so as to transfer the characters which is input in the thermal head 40 onto the recording sheet 18. One end of this transfer ribbon 46 is wound around a take-up roller 48, and is taken up onto the same by a clockwise rotation thereof as indicated by an arrow 50. On the other hand, the other end of the transfer ribbon 46 is wound around a delivering roller 52, the transfer ribbon 46 being delivered into the space between the thermal head 40 and the head roller 42 by a counter-clockwise rotation of the roller 52 as indicated by an arrow 54.

The delivering roller 52 is supported on a pair of supporting rollers 56, 58. The take-up roller 48 is connected to the head roller 42 through a transmission roller 60 and a belt 62. The rotational force of the head roller 42 is thus transmitted to the take-up roller 48.

The transfer ribbon 46 is supported between the take-up roller 48 and the delivering roller 52, by means of a guide roller 64, 66, 70, and ribbon-exfoliating rollers 68.

Between the cassette-mounting portion 30 and the printing mechanism 38, a sheet delivery sensing mechanism 72 is disposed, which senses that the recording sheet 18 has been delivered from the cassette-mounting portion 30. The sheet delivery sensing mechanism 72 comprises: a light emitting member 74, and a photoelectric detection mechanism 76 for sensing that the light emitted from the light emitting member 74 has been intercepted by the recording sheet.

Between the sheet delivery sensing mechanism 72 and the casset mounting portion 30, a pair of aligning rollers 78 are disposed, which align a forward end of the recording sheet arriving thereat before passing through the mechanism 72. When the recording sheet 18 is carried to the aligning rollers 78 from the cassette 14, it is allowed to abut against the aligning rollers 78. After the lapse of a prescribed period of time, for example, approximately 3 seconds, the aligning rollers 78 are allowed to rotate after they align the forward end of the recording sheet. Thus, after the sheet delivering sensing mechanism 72 detect whether if the sheet 18 is normally transferred they deliver this recording sheet 18 toward the printing mechanism 38. One of the aligning rollers 78 is connected to the head roller 42 through a belt 80. The drive force of the head roller 42 is thus transmitted to the aligning roller. The belt 80 is also connected to a discharge roller 82 as later described, which is disposed at the discharge opening 20 together with another discharge roller 82 paired therewith. Thus, the discharge rollers discharge, along the guide plate 22, the recording sheet 18 onto which printing has already been effected by the printing mechanism 38.

Meanwhile, the case 12 is formed, at its one side section, with air intake slits 85 for taking in the air used to cool the interior thereof. The air taken in through the air intake slits 85 is blown through the case 12 by means of a fan (not shown).

Further, a manual insertion guide 86 (described later) is removably mounted on the cassette 14. The guide 86 is provided to enable an operator to feed the recording sheet by himself into the cassette-mounting portion 30.

Figure 3:
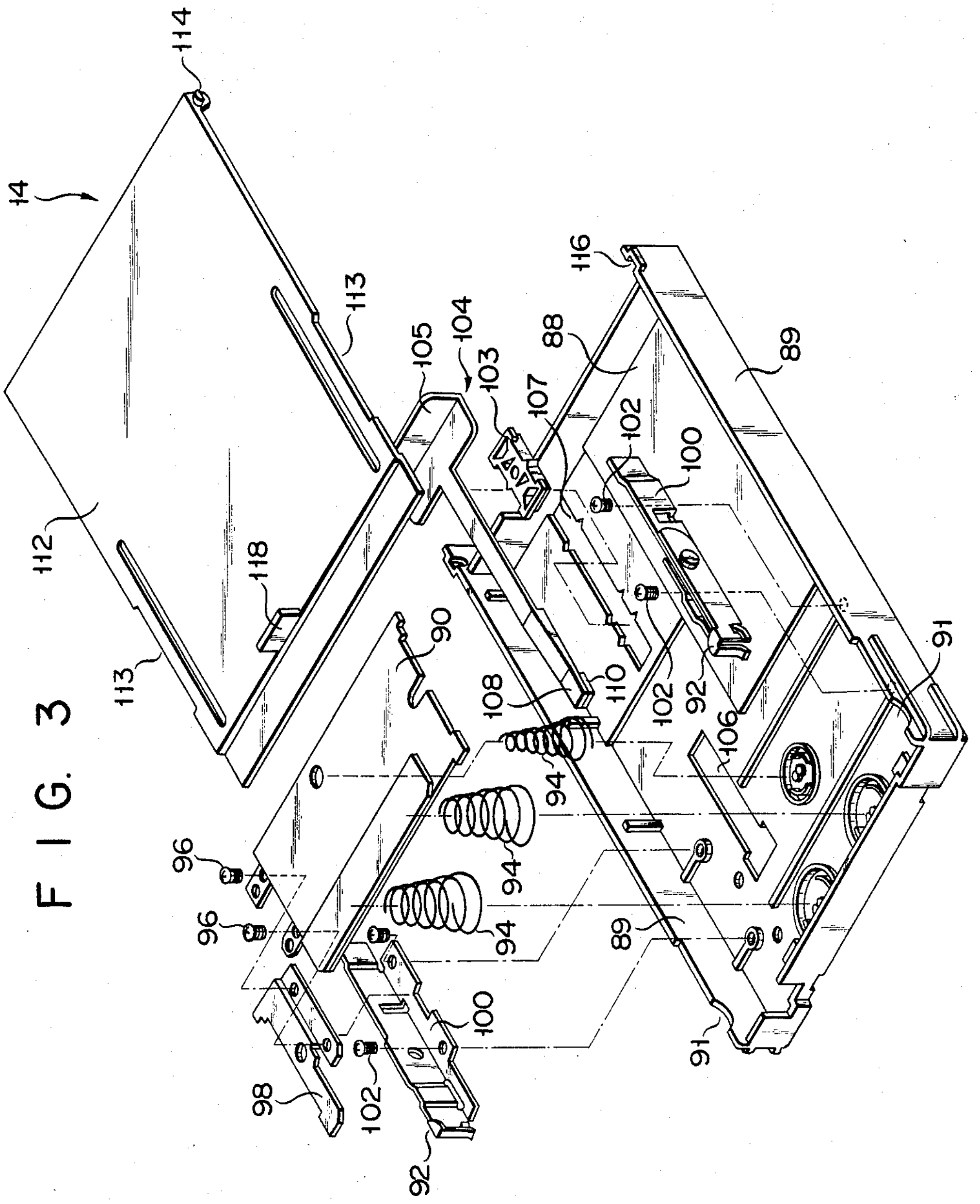
FIG. 3 is a disassembled perspective view of the cassette shown in FIG. 1.
Figure 4:
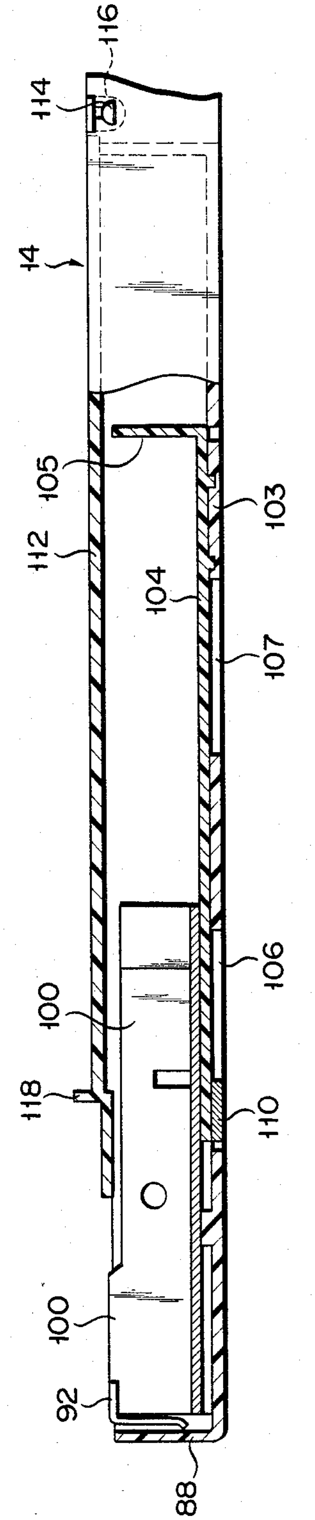
FIG. 4 is a side view, partly in section, of the cassette shown in FIG. 3.

The cassette 14 will now be described in detail with reference to FIGS. 3 and 4.

In the cassette 14, a base plate 88 is disposed thereon a placing plate 90 on which the recording sheets 18 are to be placed. The base plate 88 is provided with walls 89 on the both side thereof. A depression 91 is formed on the respective walls 89 for positioning the take-out roller 32 by abutting the guide roller 138 (described later) therein. Between the placing plate 90 and the base plate 88, conical springs 94 are disposed, which press the placing plate 90 toward separating pawls 92 as later described. The placing plate 90 is attached by means of screws 96 to a metal plate 98 that abuts against the separating pawls 92 at the times when no recording sheet 18 exists on the placing plate 90. The separating pawls 92 are provided on both sides of a path along which the recording sheet 18 is to be conveyed, respectively. More specifically, they are formed on the end of one-side end of guide plates 100 for guiding the movement of the recording sheet 18. Thus, they ensure that the recording sheet 18 piled up on the placing plate 90 is taken out on a sheet by sheet basis. The guide plates 100 are each fixed onto the base plate 88, by means of setscrews 102.

Slidably provided on the base plate 88 is a size regulating plate 104, which abuts against the rearward ends of the recording sheets 18 when the same are placed on the placing plate 90, thereby regulating the placement size of the recording sheets 18. The size regulating plate 104 is provided with a position setting member 103 at the bottom of the size regulating plate, and in the base plate 88 where a position setting hole 107 is formed which is engageable with the position setting member 103 so as to set positions of the size regulating plate 104. The size regulating plate 104 is shaped like a substantial L, and comprises an abutment portion (stopper) 105 and a forward end portion 108, said abutment portion 105 being arranged to abut against the rearward ends of the recording sheets 18, thereby setting these sheets into the cassette 14, said forward end portion 108 being formed integrally with that abutment portion 105 and made slidable in an opening 106 formed, in the form of a rectangle, in the base plate 88. On the forward end portion 108, a size sensing element 110, for example, a magnet is secured, which acts on the sheet size sensing mechanism 26 (shown in FIG. 7) disposed within the heat transfer printing apparatus 10 (shown in FIG. 1) when the cassette is mounted thereinto, by moving jointly with the size regulating plate 104.

Openably provided on the base plate 88 is a lid 112, which is made openable by means of a protruding portion 114 formed on the lid 112 and a recessed portion 116 for mounting the manual insertion guide 86 formed in the base plate 88. The lid 112 is formed with a protruding portion 118, at its forward end, which protruding portion protrudes upwards and engages with the manual insertion guide 86, to thereby permit the use of the same. Note here, as shown in FIG. 1, that the sheet sensing mechanism 24, sheet size sensing mechanism 26, motor 36, printing mechanism 38 and manual-insertion guide sensing mechanism 132 are connected to the operating plate 28 through a control mechanism 117 as later described.

Figure 5:
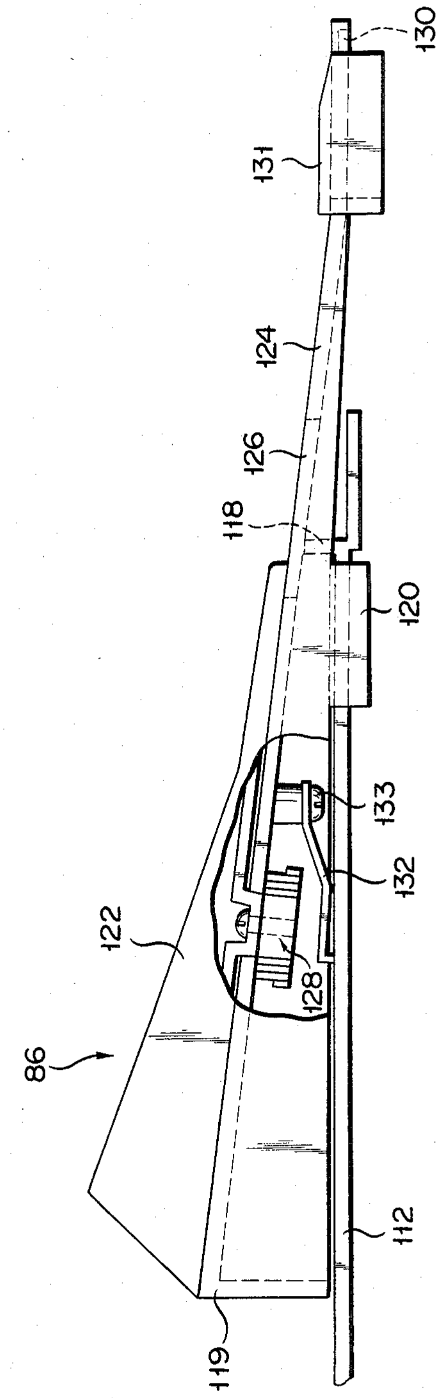
FIG. 5 is a side view, partly in section, of a manual insertion guide used in the heat transfer printing apparatus shown in FIG. 1.
Figure 6:
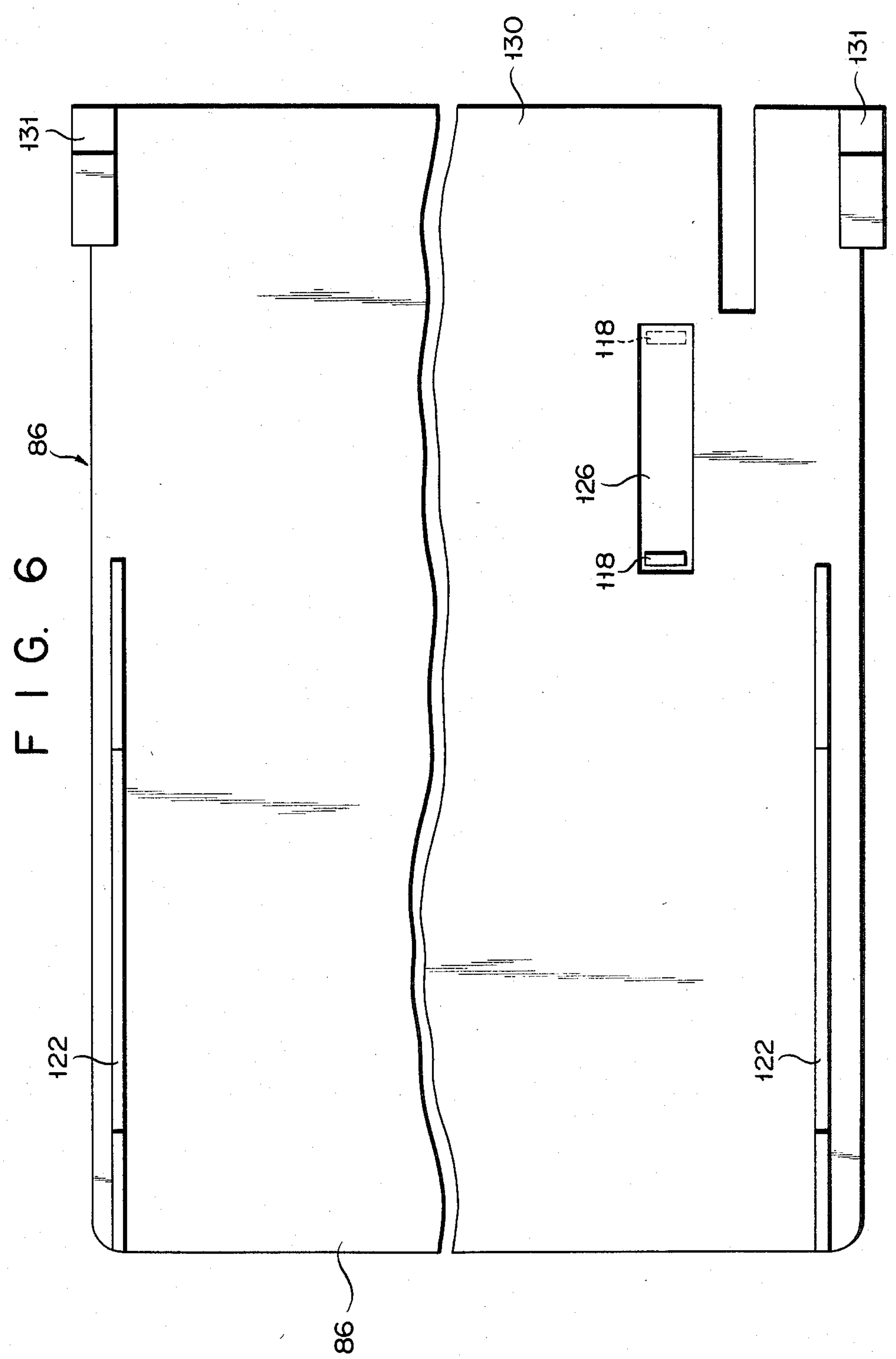
FIG. 6 is a substantially plan view of the manual insertion guide shown in FIG. 5.

The manual insertion guide 86 with reference to FIGS. 5 and 6 will now be described.

In the manual insertion guide 86, a main body 119 thereof is removably attached to the cassette 14 by its engaging pawl 120 engageable with a recess 113 which is formed on the both sides of the lid 112. The main body 119 is formed with guide plates 122 on both sides of its sheet passage, respectively, said guide plates 122 being used to guide the recording sheet inserted onto the sheet passage by the operator.

The manual insertion guide 119 is provided with a base plate 124 in an inclined manner, which guides the forward end of the recording sheet along the direction in which the same is carried. The base plate 124 is formed with an opening 126 with which the protrusion 118 is engaged. Since the base plate 124 is provided in an inclined manner, inserting the manual insertion guide 86 onto the cassette 14 and sliding this guide 86 on the lid 112 along the direction carried by the recording sheet, permits the protrusion 118 to be located below the base plate 124, as shown in FIG. 5. Thus, the forward end of the recording sheet is permitted to be guided by the base plate 88. Conversely, when said guide 86 is slid in a direction opposite to that carried by the recording sheet, the protrusion 118 is allowed to project from the base plate 124. Thus, the insertion of the recording sheet on non-manual basis is prohibited.

The main body 119 of the manual insertion guide 86 is formed, at its forward end portion 130, with a pair of push-up portions 131. When the manual insertion guide 86 is mounted into the cassette-mounting portion 30, this push-up portion 131 pushes up the take-out roller 32 so as to permit the mounting of the manual insertion guide to be detected by the manual-inserting guide sensing mechanism as later described.

The main body 119 of the manual insertion guide has a leaf spring 132 secured by means of a screw 133, onto a substantially central portion of its interior. The leaf spring 132 is engaged with recesses (not shown) formed on the lid 112 of the cassette 14, thereby fixing the manual insertion guide 86 onto the lid 112 at a prescribed position thereof.

It should be noted here that one of the guide plates 122 is attached the manual insertion guide body 119 by means of a slide block 127 and screw 128 so as to be movable along the width of the recording sheet.

Figure 8:
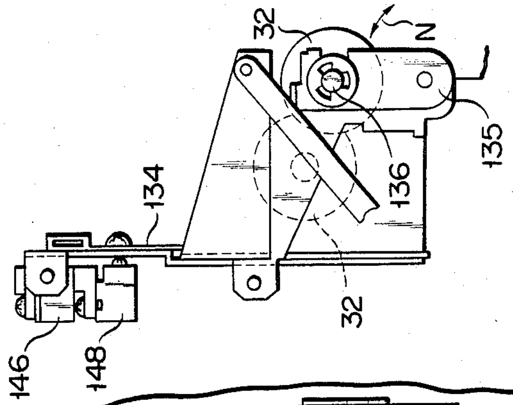
FIG. 8 is a left side view of the cassette-mounting portion shown in FIG. 7.
Figure 7:
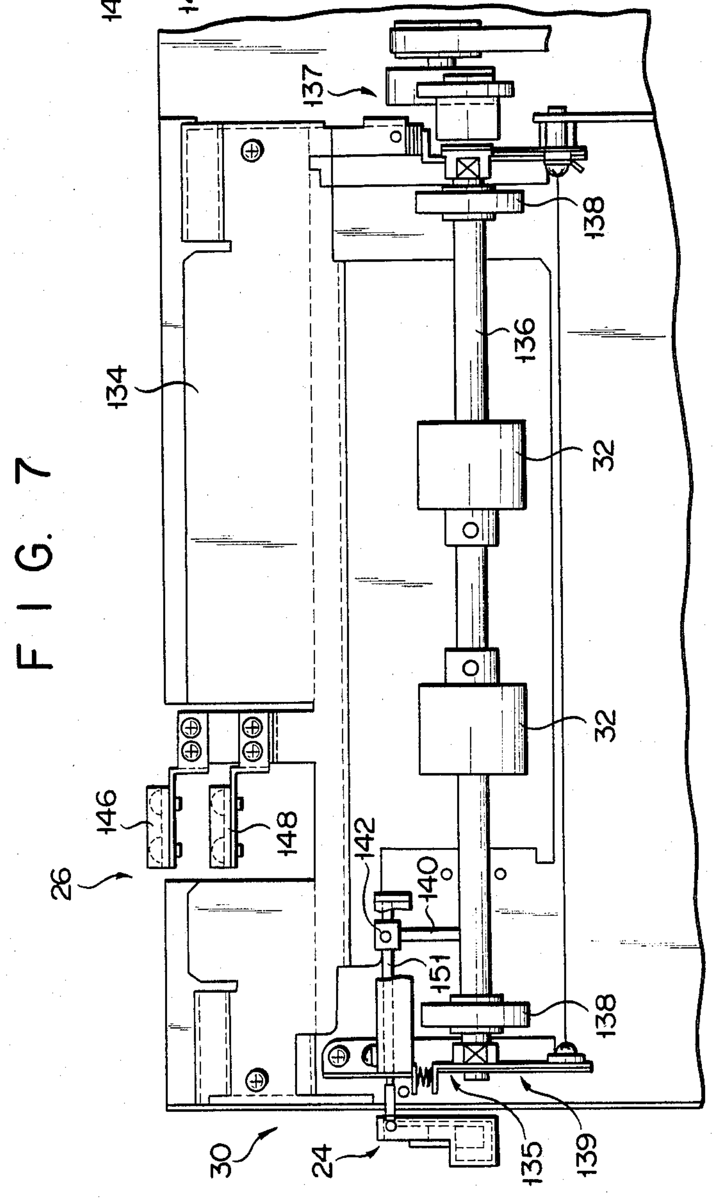
FIG. 7 is a front view showing the cassette-mounting portion of the heat transfer printing apparatus shown in FIG. 1.
Figure 9:
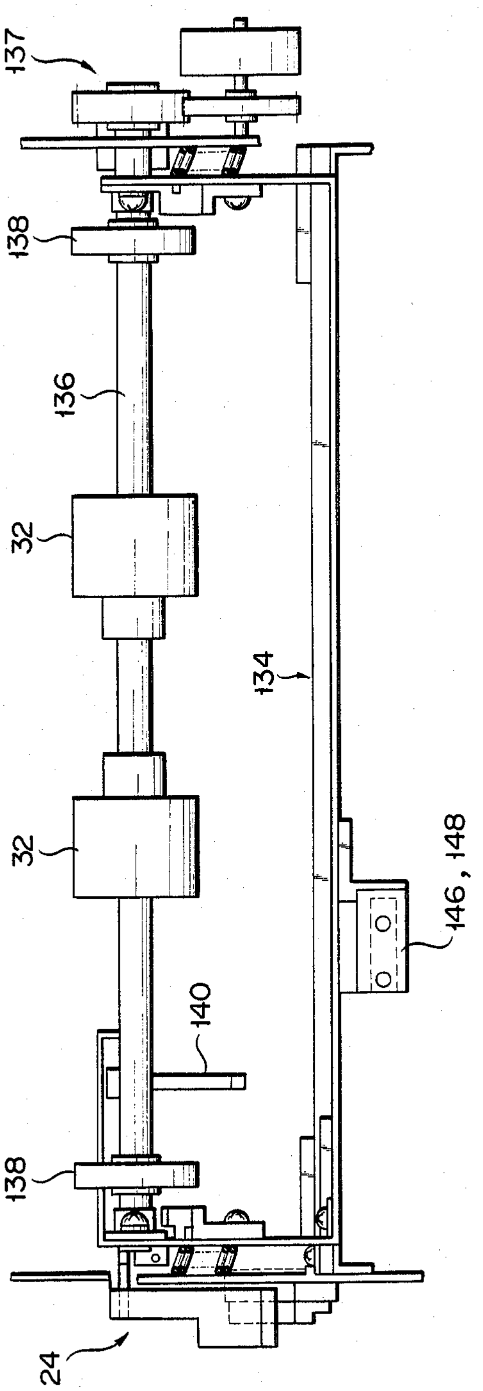
FIG. 9 is a plan view of the cassette-mounting portion shown in FIG. 7.

A detailed description of the cassette-mounting portion 30 with reference to FIGS. 7, 8 and 9 will now be provided.

In the cassette-mounting portion 30, a guide plate 134 is provided, which guides the cassette 14 to be mounted. The take-out rollers 32, which are disposed at a position spaced away from the guide plate 134 and arranged to take out the recording sheet 18 from inside the mounted cassette 14, is supported on a shaft 136 connected at one end to the motor through a drive force transmission mechanism 137. The other end of the shaft 136 is supported by a supporting arm 135 of a transmission mechanism 139 in such a manner as to be vertically movable by the same (in the directions shown in FIG. 8 by an arrow N). A pair of guide rollers 138 are supported on both ends of the shaft 136, respectively. When the manual insertion guide 86 is inserted into the cassette-mounting portion 30, the guide rollers 138 are pushed up by the above-mentioned push-up portions 131. Consequently, the guide rollers 138 are so moved as to be pushed away from the cassette 14. The shaft 136 is connected to the sheet sensing mechanism through the transmission mechanism 139 for transmission of its vertical movement (in the directions indicated by the arrow N).

At a position approximate to the shaft 136 and located upward from the guide plate 134, a sheet sensing lever 140 is provided, which senses the recording sheet 18 in the mounted cassette 14. This sensing lever 140 is connected to the sheet sensing mechanism 24 through a shaft 142.

At the side of the guide plate 134 from which the cassette 14 is inserted, a sensor means (for example, Hall elements), including a first sensor 146 and a second sensor 148, is fixed at the position which corresponds to the bore 106 of the base plate 88 when the cassette 14 is mounted. This sensor means is intended to sense the movement of the size sensing element (magnet). It is connected to a control mechanism 117 (shown in FIG. 1), whereby it sends a prescribed signal to the same 117 in accordance with its operation (as later described) when the size regulating plate 104 (FIG. 3) is set at a position for a prescribed sheet size.

The sheet sensing mechanism 24 with reference to FIGS. 10 to 17 will now be described.

Figure 11:
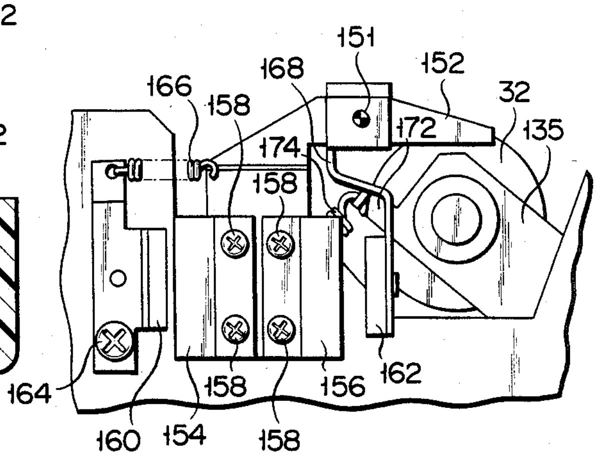

As shown in FIG. 11, in the sheet sensing mechanism 24 intended to display the presence or absence of the sheet by means of the display lamps 27, a shaft 151 is provided, on which an arm 152 shaped like a substantial L is rockably supported. To this arm 152, a first lead switch 154 and a second lead switch 156 are secured by means of setscrews 158. These switches are connected to the display lamps 27 through the control mechanism 117 as later described, whereby they send thereto a signal indicating the presence or absence of the sheet. A first magnet 160 and a second magnet 162, both of which act on the first lead switch 154 and the second lead switch 156, respectively, are provided with respect thereto in such a manner that those magnets are spaced therefrom, respectively. The first magnet 160 is secured to a portion of the case 12 by means of a setscrew 164, which portion is provided with a first spring 166 for urging the arm 152 toward this portion. This spring 166 is engaged at one end with a portion of the case 12 and is also engaged at the other end with the arm 152.

The second magnet 162 is swingably connected to the shaft 151 through an arm 168. The shaft 151 is further connected to the sheet sensing lever 140 and, by its motion interlocked with the rocking movement of the sheet sensing lever 140, permits the second magnet 162 to move away from the second lead switch 156.

On the other hand, a protrusion 172 for pushing up the arm 152 is formed on one end portion of a supporting arm 135 supporting the shaft 136 of the take-out roller 32. The protrusion 172 is provided with a second spring 174, which is intended to urge the guide roller 138 to the depression 91 (shown in FIG. 3) by means of this protrusion 172, for positioning the take-out roller 32 when the sheet is fed by the sheet feeding cassette. The second spring 174 is engaged at one end with the protrusion 172 and is fixed at the other end to the case 12.

Figure 10:
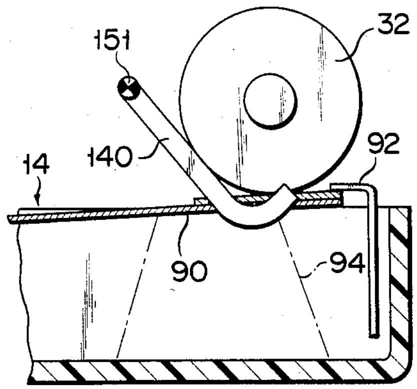
FIGS. 10 to 13 are views for explaining a sheet sensing mechanism in the case of using the paper-sheet cassette.

The operation of the sheet sensing mechanism 24 will now be described. Where the sheet feeding is effected by the use of the sheet feeding cassette 14 (automatic sheet feeding mode) and where no sheet is present in the cassette, the arm 152 is located at its first position at which the protrusion 172 is kept out of abutment thereagainst, as shown in FIGS. 10 and 11. At this stage of operation, the sheet sensing lever 140 is located at its lowest position since no sheet is present in the cassette 14. For this reason, the second magnet 162 is located at its first position at which it is kept substantially vertical in FIG. 10. Accordingly, the first and second lead switches 154, 156 are located at positions approximate to the first and second magnets 160, 162, respectively. Therefore, those lead switches are kept "on", respectively, and the display lamps 27 display "automatic sheet feeding" and "sheet absent".

Figure 12:
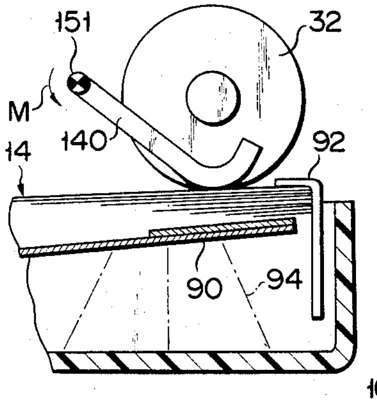
Figure 13:
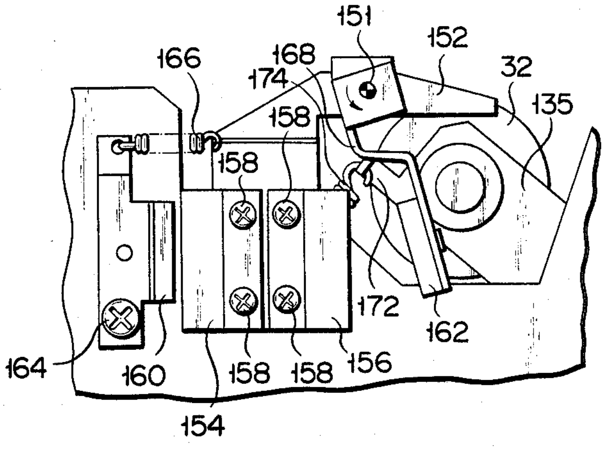

In the case where the sheet feeding is effected by the use of the cassette 14 (automatic sheet feeding mode) and where any sheet is present in the cassette, the arm 152 is located at the first position at which the protrusion 172 is kept out of abutment thereagainst, as shown in FIGS. 12 and 13. At this stage of operation, the sheet sensing lever 140 is supported by the sheet since the same is present in the cassette 14. Thus, the lever 140 is located at the second position arrived at by being rocked about the shaft 151 in a direction indicated by an arrow M. As the sheet sensing lever 140 is rocked, the second magnet 162 is spaced away from the second lead switch 156, so that the second lead switch 156 is kept "off". On the other hand, the first lead switch 154 is kept "on" since the first magnet 160 is located close thereto. Accordingly, the display of, for example, "automatic sheet feeding" and "sheet presence" is made on the display lamps 27.

Figure 14:
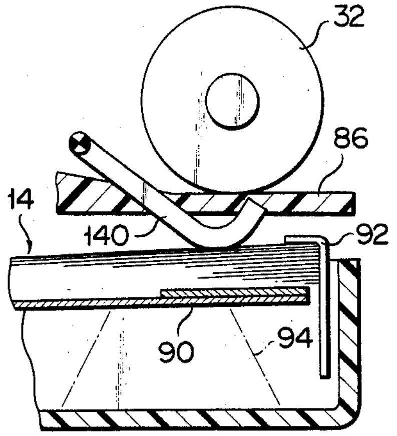
FIGS. 14 to 17 are views for explaining the sheet sensing mechanism when using the manual insertion guide; and, FIG. 18 is a view for explaining a control mechanism.
Figure 15:
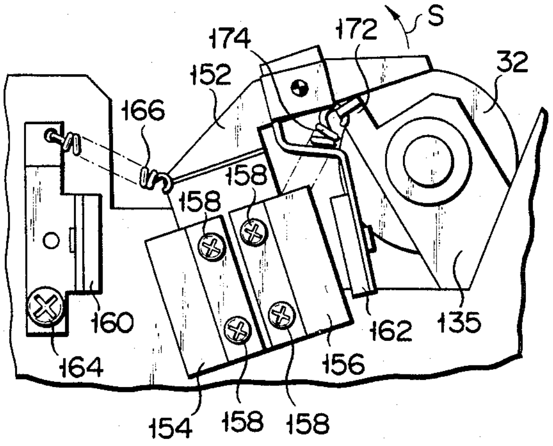

In the case where the sheet feeding is effected by the use of the manual insertion guide 86 and where no sheet is present, the sheet sensing mechanism 24 will operate as follows. When, as shown in FIG. 14 and 15, the manual insertion guide 86 is inserted into the cassette-mounting portion 30, the take-out roller 32 is pushed up by push-up portions 131 (shown in FIG. 6). For this reason, the protrusion 172 of the supporting arm 135 is allowed to abut against the arm 152, thereby causing this arm to be rocked in a direction indicated by an arrow S. Since the first lead switch 154 is located at a position spaced away from the first magnet 160, it is brought to an "off" state. On the other hand, since the sheet sensing lever 140 is supported on the sheet in the sheet feeding cassette, the lever 140 is located at the second position as shown in FIG. 13. However, the lead switch 156 is kept "on" since it is located close to the second magnet 162 due to the rocking movement of the arm 152. Accordingly, the display of "sheet absent" and "manual feeding mode" is made on the display lamp.

Figure 16:
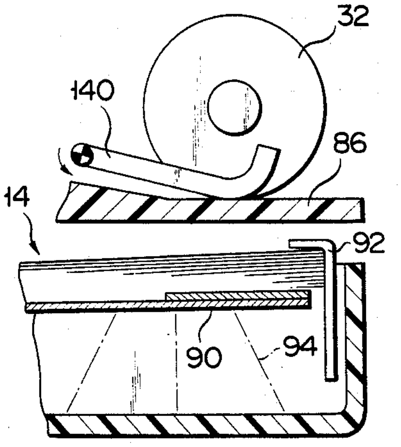
Figure 17:
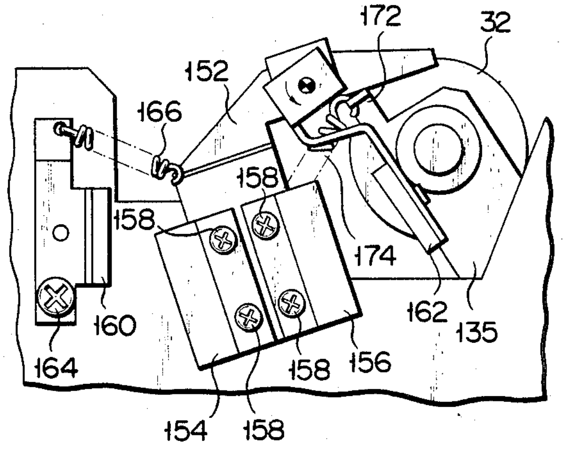

In the case where the sheet feeding is effected by the use of the manual insertion guide 86 and where the sheet is being fed, as shown in FIGS. 16 and 17, the first lead switch is located at a position spaced away from the first magnet. Therefore, the switch is kept "off", with the result that the display of "manual insertion guide" is made on the display lamp 27. On the other hand, the sheet sensing lever 140 is supported by the sheet on the manual insertion guide 86 and is rocked in a direction indicated by an arrow M. Accordingly, the second magnet 162 is spaced away from the second lead switch 156, which is brought to an "off" state. Thus, the display of "sheet present" and "manual feeding mode" is made on the display lamp.

Figure 18:
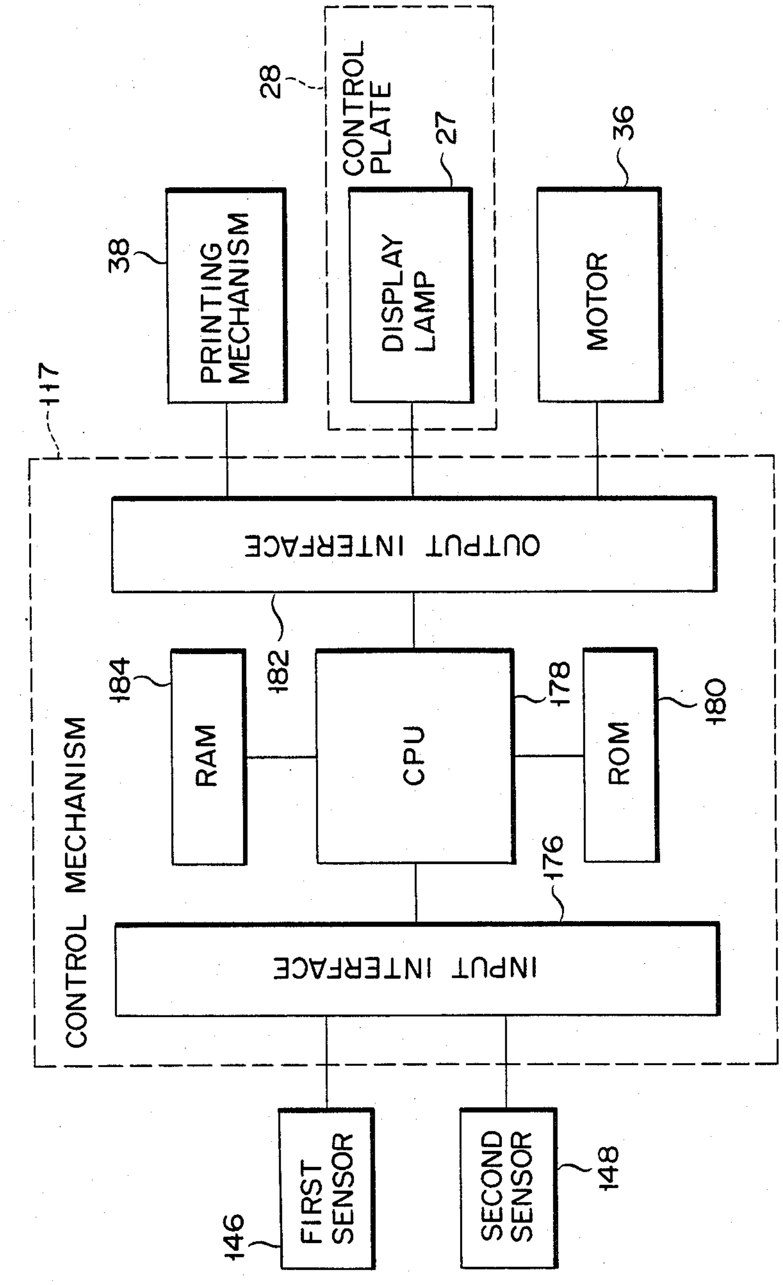

The sheet size sensing mechanism 26 with reference to FIG. 18 will now be described.

The size regulating plate 104 is slid into the cassette and set at its prescribed position in accordance with the three sizes of recording sheet: A-4 size (210×297 mm), letter size (215.9×279 mm), and legal size (215.9×355.6 mm). As the size regulating plate 104 is moved, the magnet 110 provided thereto is also moved and is set at its prescribed position (refer to FIG. 5).

For example, where the sheet of A-4 size is set in the cassette 14, similarly, only the first sensor 146, operates to send a detection signal to CPU 178 through the input interface 176.

Where the sheet of letter size is set in the cassette 14, the second sensor 148 only operates in resonse to the movement of the magnet 110, thereby to send a detection signal to CPU 178 through an input interface 176.

Further, where the sheet of legal size is set in the cassette 14, both the first sensor 146 and the second sensor 148 operate to send their now detection signals to CPU 178 through the input interface 176, respectively.

In CPU 178, determination of the "size" is made in accordance with those detection signals. That is, when the detection signal is supplied thereto only from the first sensor 146, it is determined that the sheet in question is of A-4 size. When the detection signal is supplied thereto only from the second sensor 148, it is determined that the sheet is of letter size. When the non-detection signal is supplied thereto from the first and second sensors, it is determined that the sheet is of legal size.

Upon determination by CPU 178, of the sheet size a control signal is sent to the display plate 28 through an output interface 182 in response to a signal from ROM 180 previously stored with a control program for CPU 178. In the display plate 28, the lamps 27 intended to display the A-4 size, letter size, and legal size are flickered in accordance with the signals sent thereto, thereby displaying the size of the recording sheet 18 set in the sheet feeding cassette 14. Accordingly, it is possible to reliably display the size of the sheet to be recorded or printed, through the sliding movement of the sheet size regulating plate 104 provided in the cassette as well as by means of the compact construction involved.

When printing is effected, corresponding to the size of the recording sheet, the CPU 178, after its determination of the "size", reads the number of dots of one line stored in RAM 184. In this RAM 184, a printing buffer provided, with the number of the printing dots per line corresponding to a prescribed sheet size is stored. CPU 178 reads out a signal dot by dot from that printing buffer and sends it to the printing mechanism 38 through the output interface 182.

Simultaneously, in accordance with the printing mode corresponding to the sheet size, adjustment of the rotational speed of the motor 36 is made, namely the speed with which the sheet to be printed is conveyed. Since, in this case, RAM 184 is previously stored with a signal indicating the conveying speed corresponding to the sheet size, ROM 180 fetches this signal, dot by dot from RAM 184 and sends a pulse signal to the motor 36 through the output interface 182. Accordingly this embodiment, therefore, it is possible not only to handle various sizes of recording sheets by the use of only a single cassette but also to display such various sizes as well as to reliably execute the printing operation corresponding to such sheet size.

The present invention is not limited to the above-mentioned embodiment, but permits various modifications to be made without departing from the spirit and scope of the invention.

For example, in the above-mentioned embodiment, description was made by taking the heat transfer printing apparatus as an example, but the invention is not limited thereto but makes it possible to obtain similar effects even when it is applied to facsimile, electronic copying machines, or other recording apparatus.

Further, in the above-mentioned embodiment, description of the sheet size sensor was made by using Hall elements as an example. However, the invention is not limited thereto but permits the use of a magnetic head or optical sensor. In the case of using the optical sensor, a shielding member capable of intercepting the transmission of light is used as the size regulating plate.

Further, in the above-mentioned embodiment, the size of the sheet to be recorded was explained by using the three sizes—A-4 size, letter size and legal size—as the example. However, the invention permits the use of B-5 size, B-4 size, A-3 size, etc. Further, the invention permits two or four sheet sizes to be sensed, and is not limited to three sizes. In the case of sensing four sizes, a state is included wherein the first sensor and second sensor issues the detection signal.

What is claimed is:

1. A recording apparatus for recording information onto a sheet comprising:

a main body;

a printing means provided in said main body for effecting the printing onto said sheet;

a cassette for receiving the sheet provided separately from said main body;

a cassette-mounting means for mounting said cassette at a position located above said main body and obliquely with respect thereto;

a sheet feeding means for feeding said sheet received in said cassette toward said printing means;

a stopper means movably provided to said cassette in accordance with various size sheets received in said cassette, thereby setting said sheet into said cassette;

a sheet size regulating member connected to said stopper means and movably provided to a prescribed position in accordance with the movement of said stopper means, a sheet size sensing means for sensing the size of the sheet received in said cassette provided to said cassette-mounting means and sensing the position of said sheet size regulating member and generating a detection signal; and a display means for displaying the size of the sheet received in said cassette in accordance with the signal from said sheet size sensing means.

2. A recording apparatus according to claim 1, wherein said stopper means has an abutment portion which moves along a direction in which the sheet received in said cassette is to be carried and abuts against a rearward end of said sheet, thereby aligning it.

3. A recording apparatus according to claim 1, wherein said sheet size regulating member has a magnet and said sheet size sensing means has a sensor for sensing said magnet.

4. A recording apparatus according to claim 1, wherein said sheet feeding means has an aligning roller for aligning a forward end of the sheet.

5. A recording apparatus according to claim 1, wherein said display means has lamps for displaying the dimension of the sheet, and a control means including a display buffer arranged to select the lamp to be lit in accordance with the dimension of the sheet sensed by said sheet size sensing means.

6. A recording apparatus according to claim 5, wherein said control means has a printing buffer for controlling the number of printing dots per line in accordance with the size of the sheet sensed.

7. A recording apparatus according to claim 5, wherein said sheet feeding means has a motor; and said control means includes a sheet feeding buffer used to control the speed of feeding the sheet, in accordance with the dimension of the sheet sensed.

8. A recording apparatus according to claim 1, wherein said cassette has a manual insertion guide for guiding the sheet to said printing means manually sheet by sheet in accordance with the manual insertion mode.

9. A recording apparatus according to claim 8, wherein said manual insertion guide has an engaging portion engaged slidably with said cassette and also has a manual insertion mode display means for displaying a first position permitting the sheet feeding to be executed under manual insertion mode and a second position prohibiting the sheet feeding under manual insertion mode.

10. A recording apparatus according to claim 9, wherein said cassette is formed with a protrusion; and said manual insertion guide is formed with an engaging bore engageable with said protrusion wherein, when said manual insertion guide is located at said first position, said protrusion is not projected from said engaging bore, and that, when said manual insertion guide is located at said second position, said protrusion is projected from said engaging bore to prohibit said sheet from being guided.

11. A recording apparatus according to claim 8, wherein said sheet feeding means has a take-out roller arranged to take out the sheet received in said cassette and deliver the same toward said printing means.

12. A recording apparatus according to claim 11, wherein said sheet feeding means has a manual insertion sensing mechanism arranged to sense the fact that said manual insertion guide has been mounted and generates a signal indicating the mounting of said manual insertion guide; and said display means has a manual insertion display lamp arranged to display the mounting of said manual insertion guide in response to a signal from said manual insertion sensing mechanism.

13. A recording apparatus according to claim 12, wherein said take-out roller has a magnet which is provided such that it is movable by the mounting of said manual insertion guide and moved by the movement of said take-out roller; and said manual insertion sensing mechanism has a first lead switch which is switched on at the time when said magnet comes near thereto due to its relative movement and which is switched off at the time when said magnet goes away therefrom due to its relative movement.

14. A recording apparatus according to claim 12, wherein said sheet feeding means has a sheet sensing mechanism arranged to sense the absence of a sheet in said cassette as well as the absence of a sheet on said manual insertion guide and send a detection signal indicating the absence of a sheet; and said display means has an "absence-of-sheet-" display lamp for displaying the absence of sheet in response to the detection signal from said sheet sensing mechanism.

15. A recording apparatus according to claim 14, wherein said sheet sensing mechanism has a sheet sensing lever which is rockably supported by a shaft at one end and which has the other end directed toward said cassette and supported on the sheet to be fed into the apparatus; said sheet sensing lever has a magnet which is moved by the rocking movement of the lever, and a second lead switch which is switched on when said magnet comes near thereto and which is switched off when said magnet goes away therefrom.

* * * * *